US007925560B2

(12) United States Patent
Strela et al.

(10) Patent No.: US 7,925,560 B2
(45) Date of Patent: Apr. 12, 2011

(54) SYSTEMS AND METHODS FOR VALUING A DERIVATIVE INVOLVING A MULTIPLICATIVE INDEX

(75) Inventors: Vasily Strela, New York, NY (US); Matthew Grayson, New York, NY (US)

(73) Assignee: Morgan Stanley, New York, NY (US)

( * ) Notice: Subject to any disclaimer, the term of this patent is extended or adjusted under 35 U.S.C. 154(b) by 672 days.

(21) Appl. No.: 11/296,611

(22) Filed: Dec. 7, 2005

(65) Prior Publication Data
US 2007/0130041 A1    Jun. 7, 2007

(51) Int. Cl.
*G06Q 40/00* (2006.01)
(52) U.S. Cl. ..................................... 705/36 R
(58) Field of Classification Search .................. None
See application file for complete search history.

(56) References Cited

U.S. PATENT DOCUMENTS

| | | | |
|---|---|---|---|
| 6,856,973 B1* | 2/2005 | Bott | 705/36 R |
| 7,340,427 B1* | 3/2008 | Cornell | 705/37 |
| 7,376,604 B1* | 5/2008 | Butcher | 705/35 |
| 7,451,105 B1* | 11/2008 | Doyle | 705/37 |
| 7,533,049 B2* | 5/2009 | Sato | 705/36 R |
| 7,571,136 B2* | 8/2009 | May | 705/37 |
| 7,620,578 B1* | 11/2009 | Belton et al. | 705/35 |
| 7,689,497 B2* | 3/2010 | May | 705/37 |
| 2002/0111891 A1* | 8/2002 | Hoffman et al. | 705/36 |
| 2003/0028462 A1* | 2/2003 | Fuhrman et al. | 705/36 |
| 2004/0111358 A1* | 6/2004 | Lange et al. | 705/37 |
| 2004/0225598 A1* | 11/2004 | Goldberg et al. | 705/38 |
| 2005/0086152 A1* | 4/2005 | Sweeting | 705/37 |
| 2005/0097029 A1* | 5/2005 | Cooper | 705/37 |
| 2005/0114260 A1* | 5/2005 | Gula, IV | 705/39 |
| 2005/0131796 A1* | 6/2005 | Bridges et al. | 705/36 |
| 2005/0216384 A1* | 9/2005 | Partlow et al. | 705/35 |
| 2006/0053073 A1* | 3/2006 | Marlowe-Noren | 705/35 |
| 2006/0143099 A1* | 6/2006 | Partlow et al. | 705/35 |
| 2006/0229955 A1* | 10/2006 | Ono et al. | 705/35 |
| 2007/0156555 A1* | 7/2007 | Orr | 705/35 |

OTHER PUBLICATIONS

Meeting of the West Virginia Higher Education Policy Commission. Aug. 22, 2003. Marshall University Graduate College South Charleston, West Virginia.*
Models for Simulating BMA and Libor Interest Rates, Peter Orr and Yuri Balasanov Nov. 21, 2005 (date on publication), 2006 internet archive date. (11 pages).*
Tax Reform Safeguards Key for Orlando Florida, Muni Swap Peter Heap, Bond Buyer v313n2978 Sep. 6, 1995, 1 page.*

(Continued)

*Primary Examiner* — Alexander Kalinowski
*Assistant Examiner* — Bruce I Ebersman
(74) *Attorney, Agent, or Firm* — K&L Gates LLP (57) ABSTRACT

Methods for calculating a value of a derivative based on a multiplicative index, where the multiplicative index is a multiple of an underlying index. The methods may comprise the steps of providing a first value of the underlying index and estimating a ratio of the multiplicative index over the underlying index as a first function of the underlying index over a first range of values of the underlying index. The method may also comprise the steps of calculating at least one parameter of the first function by comparing the first function to historical values of the multiplicative index and the underlying index. In addition, the method may comprise the steps of calculating a first value for the ratio given the first value of the underlying index, and calculating the value of the derivative for the first value of the ratio.

15 Claims, 5 Drawing Sheets

OTHER PUBLICATIONS

Marshall University (meeting of the West Virginia Higher Education Policy Commission, Aug. 22, 2203).*

Models for Simulating BMA and Libor Interest Rates, Peter Orr and Yuri Balasanov.*

U.S. Appl. No. 12/082,280, filed Apr. 10, 2008 entitled: "Systems and Methods for Modeling a Multiplicative Index".

Yvette Sheilds, "Testing the Swap Waters: Illinois Plans $600M Floating-to-Fixed-Rate Deal," The Bond Buyer, v. 346, n. 3174, p. 1, Oct. 22, 2003.

Peter Block, Eden Perry, Colleen Woodell, William Montrone, "Public Finance Criteria: Debt Derivative Profiles," Standard & Poor's, Sep. 29, 2004.

Robert Brooks, "Urban Finance and the Cost of Tax Policy Uncertainty: Evidence from the Municipal Swap Market," Working Paper No. 01-01-01, Department of Economics, Finance and Legal Studies, The University of Alabama, Tuscaloosa, Alabama, Jan. 18, 2001.

"Review of Metropolitan Nashville Airport Authority Swap and Derivatives Risks," Metropolitan Government of Nashville and Davidson County, Oct. 28, 2002.

"Broker Sets Up Muni Options Biz," Wall Street Letter, v. 36, n. 23, p. 6, Jun. 7, 2004.

"A Subtle Change in Muni Swaps: Move to Libor Points Up a Growing Shift to Becoming a Risk-Taker's Market," Investment Dealers Digest, Apr. 21, 2003.

Alex Maurice, "Connecticut HFA Test-Drives an Innovative Swap Agreement," The Bond Buyer, v. 335, n. 31095, p. 1, Mar. 13, 2001.

Elizabeth Albanese, "Houston Completes First-Ever Texas GO Swap Transaction," The Bond Buyer, v. 347, n. 31830, Feb. 27, 2004.

"Michael McDonald," Derivatives: Libor-Based Benchmarks Could Weaken Credits, S&P. SaysThe Bond Buyer, v. 343, n. 31578, p. 6, Feb. 21, 2003.

"Hedge Funds Reap High Returns on TOBs as Treasuries Fall," Derivatives Week, v. 12, n. 3, p. 7, Jan. 20, 2003.

James W. Lovely, Richard B. Stephens, *Fixed Spread Basis Swap: Trade Summary*, Holland & Knight Public Finance, vol. 5, Issue 1, Jan. 2005, accessed at http://www.hklaw.com/content/newsletters/pubfinance/publicfinance012605.pdf.

Richard B. Stephens and James W. Lovely, *Derivatives for Governmental Users: Basics, Uses and Risks*, Holland & Knight Public Finance, vol. 4, Issue 1, May 2004, accessed at http://www.hklaw.com/content/newsletters/pubfinance/pubfinance052404.pdf.

Han H. Lee, *Interest Rate Risk—Models, Similarities and Differences*, printed from http://www.financewise.com/public/edit/riskm/interestrate/interestraterisk00-modelsp.htm on Sep. 1, 2005.

*Swap Market Pricing*, dated Dec. 6, 2004, printed from www.nast.net/treasury%20mgt/Swap%20Market%20Pricing.ppt. on Sep. 1, 2005.

* cited by examiner

SYSTEMS AND METHODS FOR VALUING A DERIVATIVE INVOLVING A MULTIPLICATIVE INDEX

BACKGROUND OF THE INVENTION

Many financial assets are valued based on indices that are multiplicative spreads over underlying indices. For example, many financial assets are valued based on the BMA Municipal Swap Index ("the BMA rate"). The BMA rate is an indicator of the market interest rate for tax-exempt municipal bonds issued by state and local governments. The BMA rate can be expressed as the appropriate LIBOR rate multiplied by a ratio.

Most existing models of the BMA rate and/or the ratio are based on the theory that the BMA rate is nothing more than the LIBOR rate corrected for the tax exempt status of municipal bonds in the United States. According to that theory, when the top marginal tax rate in the United States is 35%, the ratio of the BMA rate over LIBOR should be approximately 65%, (e.g., 100% minus 35% of the LIBOR rate). This leads to the theoretical assumptions that: (1) the ratio of BMA over LIBOR is constant; and (2) the volatility of BMA is equal to the volatility of LIBOR. In practice, however, there are significant conditions under which neither of these assumptions hold true. Accordingly, existing models are incapable of accurately modeling the BMA rate or the ratio of the BMA rate over LIBOR.

BRIEF SUMMARY OF THE INVENTION

According to one general aspect, embodiments of the present invention are directed to methods for calculating a value of a derivative based on a multiplicative index, where the multiplicative index is a multiple of an underlying index. The methods may comprise the steps of providing a first value of the underlying index and estimating the multiplicative index or a ratio of the multiplicative index over the underlying index as a first function of the underlying index over a first range of values of the underlying index. The methods may also comprise the step of calculating at least one parameter of the first function by comparing the first function to historical values of the multiplicative index and the underlying index. In addition, the methods may comprise the steps of calculating a first value for the multiplicative index or the ratio given the first value of the underlying index, and calculating the value of the derivative for the first value of the multiplicative index or the ratio.

According to another general aspect, embodiments of the present invention are directed to methods for calculating a value of a derivative based on a multiplicative index, where the multiplicative index is a multiple of the underlying index. The methods may comprise the steps of providing a first value of the underlying index and estimating a relationship between the multiplicative index and the underlying index as a first function over a first range of values of the underlying index. The methods may also comprise the step of calculating at least one parameter of the first function by comparing the first function to historical values of the multiplicative index and the underlying index. In addition, the methods may comprise the steps of substituting the first function into a value function of the derivative to yield a value function that is a function of the underlying index, and calculating the value of the derivative by computing the value function for the first value of the underlying index.

According to yet another general aspect, the present invention is directed to a system for calculating a value of a derivative based on a multiplicative index, where the multiplicative index is a multiple of the underlying index. The system may comprise a calculation module and an application module. The calculation module may be configured to estimate a relationship between the multiplicative index and the underlying index as a first function over a first range of values of the underlying index, and calculate at least one parameter of the first function by comparing the first function to historical values of the multiplicative index and the underlying index. The application module may be configured to apply the first function to calculate a value of the derivative.

BRIEF DESCRIPTION OF THE FIGURES

Embodiments of the present invention are described below by way of example in conjunction with the following figures, wherein.

DETAILED DESCRIPTION OF THE INVENTION

As used herein, the term "financial asset" refers to any non-physical item of economic value. Examples of financial assets include units of equity, fixed income assets, derivatives, any other securities, for example, as defined by the Securities Act of 1933, etc.

As used herein, the term "derivative" refers to any kind of financial asset whose value is based on another financial asset, index, or other economic measure. Non-limiting examples of derivatives include caps, swaps, swaptions, exotic derivatives, etc.

A multiplicative index is an economic measure, such as an interest rate, that can be expressed as an underlying index multiplied by a ratio of the multiplicative index over the underlying index. For example, the BMA rate is a multiplicative index that can be expressed as an underlying index (e.g., the LIBOR rate) times the ratio of the BMA rate over LIBOR. In various embodiments, the multiplicative index and the underlying index may have a similar term. For example, the BMA rate has a term of one week, so the seven day LIBOR rate may be used as its underlying index. Also, in various embodiments, longer term LIBOR rates may be used as the underlying index by setting the multiplicative index as a rolling average of BMA rate over the term of the LIBOR rate. For example, the thirty day LIBOR rate may be used as the underlying index for a four week rolling average of the BMA rate.

Yield compression is a phenomenon exhibited by multiplicative indices where the ratio of the multiplicative index over its underlying index is dependent on the value of the underlying index. Accordingly, volatility of the multiplicative index is based on the volatility of the underlying rate, as well as the separate volatility of the ratio. For example, the value and volatility of the ratio of the BMA rate over LIBOR (the BMA/LIBOR ratio) shows a strong dependence on LIBOR. It will be appreciated that the type of dependence between the ratio and the underlying index may vary with different multiplicative/underlying index pairs. For example, with the BMA/LIBOR pair, when LIBOR is relatively high, the BMA/LIBOR ratio exhibits a low volatility and deviates only slightly from its historical values. On the other hand, when LIBOR is relatively low, the BMA/LIBOR ratio becomes considerably larger than its historical values and exhibits a high volatility.

There are several potential economic mechanisms that may explain the behavior of the BMA/LIBOR pair. For example, one potential explanation holds that as LIBOR declines, BMA, which is a fraction of LIBOR, may be pushed so low that demand for instruments paying the BMA rate is destroyed. Accordingly, market forces may be responsible for pushing the BMA rate above its theoretical value to a level that restores demand. It will be appreciated, however, that various embodiments of the present methods and systems do not depend on this, or any other explanation of the behavior of multiplicative and underlying index pairs.

Figure 1:
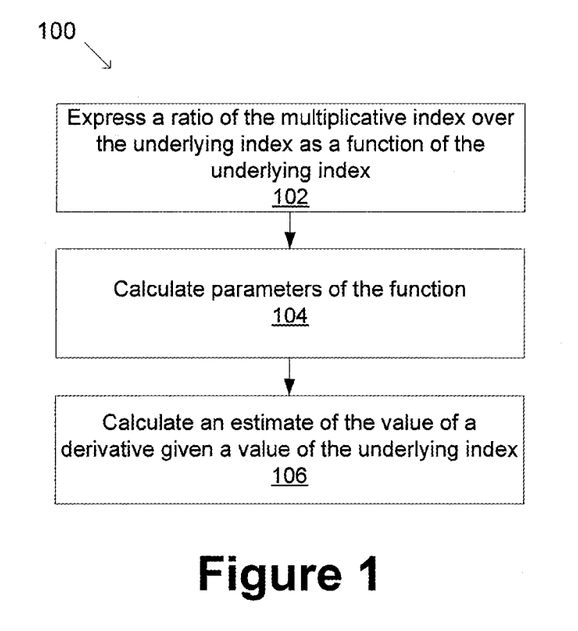
FIG. 1 is a flow chart illustrating a process flow according to various embodiments.

FIG. 1 shows a flow chart illustrating a process flow 100 for generating a model of a multiplicative index/underlying index ratio in terms of the underlying index according to various embodiments. The multiplicative and underlying indices may be any multiplicative and underlying index pair including, for example, the BMA rate and LIBOR. The model developed according to process flow 100 may be used to generate predicted values of derivatives based on the ratio and/or the multiplicative index, given values of the underlying index, as described below. Also, in various non-limiting embodiments, the models developed according to the process flow 100 may be used to generate more sophisticated models of financial assets (e.g., derivatives) based on the multiplicative index, for example, as described below with regard to process flow 300.

Referring back to FIG. 1, at step 102, the ratio of the multiplicative index over the underlying index is expressed as a function of the underlying index. This will allow the resulting model to consider the ratio's dependence on the underlying index. In various embodiments, the ratio ($R_{t,T}$) may be expressed in the form:

$$R_{t,T} = \frac{B_{t,T}}{F_{t,T}} = f(F_{t,T}) = (a_T F_{t,T}^2 + b_T F_{t,T} + c_T)\Theta(F_{t,T}) + \left(c_T - \frac{b_T^2}{4a_T}\right)(1 - \Theta(F_{t,T})) \quad (1)$$

where, $\Theta(F_{t,T}) = 1$, if $F_{t,T} \leq -\frac{b_T}{2a_T}$;

$\Theta(F_{t,T}) = 0$, if $F_{t,T} > -\frac{b_T}{2a_T}$; and where $B_{t,T}$ is the multiplicative index and $F_{t,T}$ is the underlying index. It will be appreciated that Equation 1 above is expressed as a quadratic/constant pair with a first quadratic range for low values of the underlying index $$\left(e.g., F_{t,T} \leq -\frac{b_T}{2a_T}\right),$$

and a second constant range representing higher values of the underlying index $$\left(e.g., F_{t,T} > -\frac{b_T}{2a_T}\right).$$

This property may make Equation 1 particularly useful for modeling the BMA/LIBOR pair as well as other pairs where higher values of the underlying index bring about lower ratio values and volatility.

Although Equation 1 is expressed as a quadratic/constant pair, it will be appreciated that any polynomial, or other continuously differentiable function may be used to express the ratio of the multiplicative index over the underlying index as a function of the underlying index. The type of expression used may depend on the type of the relationship between the ratio and the underlying index. For example, in various embodiments, the ratio may be expressed as an exponential function of the underlying index.

Figure 5:
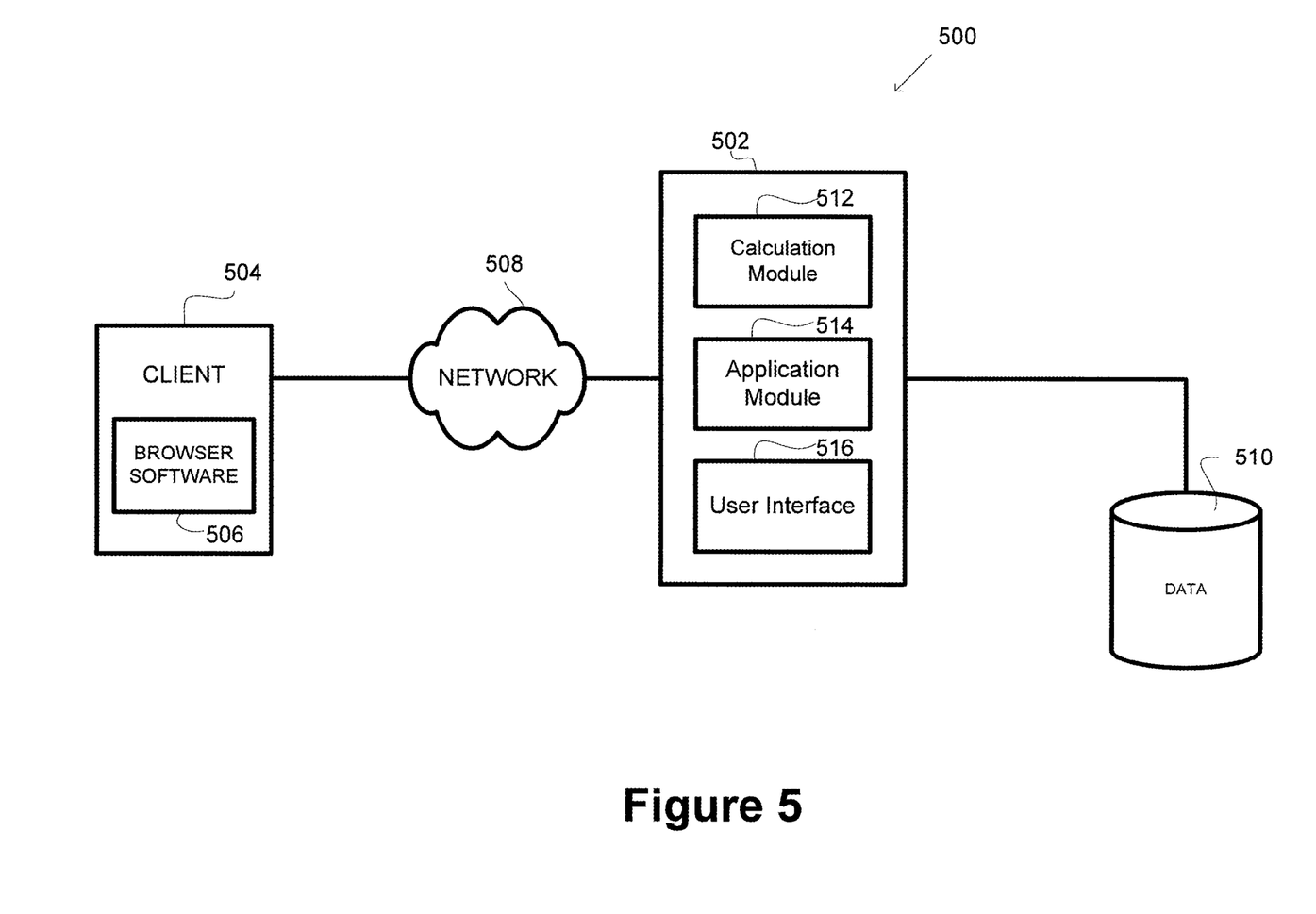
FIG. 5 is a diagram of a system according to various embodiments.

At step 104, parameters of the function of the ratio in terms of the underlying index may be calculated, for example, to achieve the best fit between the function and historical values of the multiplicative index and the underlying index and ratio. For example, the coefficients, $a_T$, $b_T$, $c_T$, of Equation 1 may be calculated. The parameters or coefficients may be found according to any suitable method. For example, in one non-limiting embodiment, the coefficients may be found according to a linear regression such as, for example, a least squares fitting. Actual calculation of the coefficients may, in various embodiments, be performed by a computer, for example, a computer included in the system 500 described in more detail below.

Figure 2:
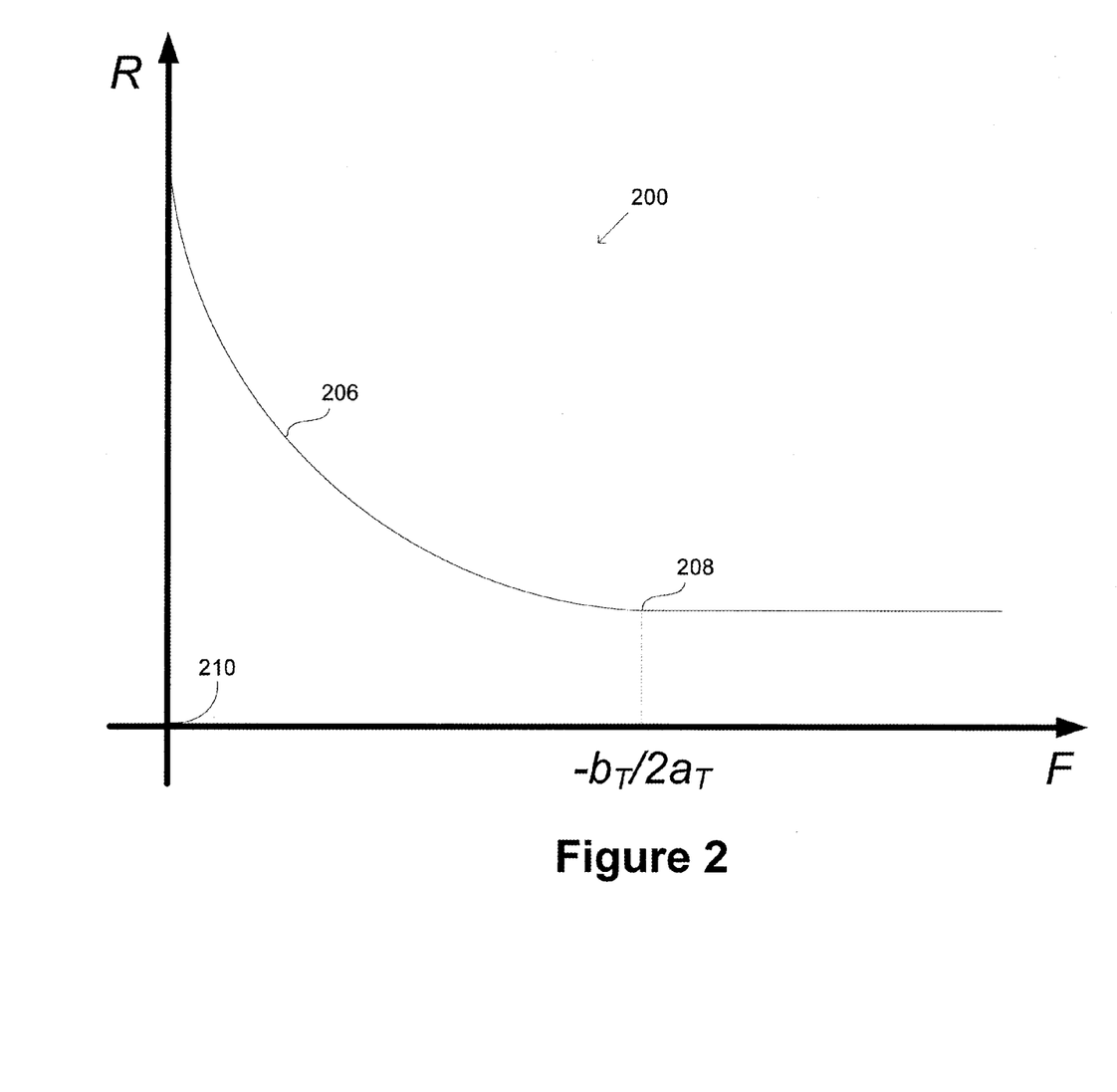
FIG. 2 is diagram of a curve according to various embodiments.

FIG. 2 shows a diagram 200 of a curve 206 representing the ratio, $R_{t,T}$ in terms of the underlying index, $F_{t,T}$ according to various embodiments. For example, the curve 206 may represent an implementation of Equation 1 above. For values of $F_{t,T}$ between zero (point 210) and $$-\frac{b_F}{2a_T}$$

(point 208), the curve 206 is shown as a quadratic function. For values of $F_{t,T}$ greater than $$-\frac{b_F}{2a_T}$$

(point 208), the curve 206 is shown as a constant.

It will be appreciated that Equation 1 may be solved in terms of the underlying index as shown by Equation 2 below:

$$B_{t,T} = (a_T F_{t,T}^2 + b_T F_{t,T} + c_T)\Theta(F_{t,T})F_{t,T} + \left(c_T - \frac{b_T^2}{4a_T}\right)(1 - \Theta(F_{t,T}))F_{t,T} \quad (2)$$

where, $\Theta(F_{t,T}) = 1$ if $F_{t,T} \leq -\frac{b_F}{2a_T}$; and $\Theta(F_{t,T}) = 0$ if $F_{t,T} > -\frac{b_F}{2a_T}$ Use of Equation 2 may facilitate the valuation of derivatives based on the multiplicative index including, for example, BMA rate caps, etc.

Referring back to FIG. 1, the value of a derivative based on the multiplicative index and/or the ratio may be found at step 106. For example, a value of the underlying index may be provided. The value may represent an estimate of the underlying index at some point over the term of the derivative. Equations 1 and/or 2 may be solved for the provided value of the underlying index, leading to an estimate of the ratio and/or multiplicative index. The value of the derivative may then be found for each estimate of the ratio and or multiplicative index based on the terms of the derivative.

Figure 3:
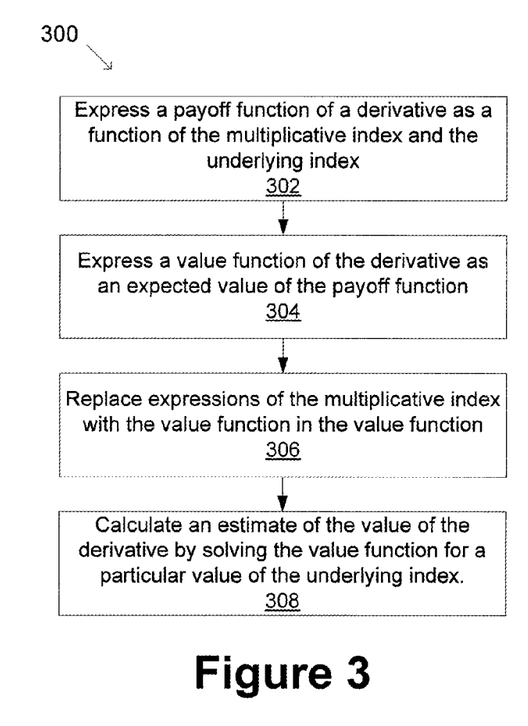
FIG. 3 is a flow chart illustrating a process flow according to various embodiments.

FIG. 3 shows a flow chart of another process flow 300 for estimating the value of a derivative dependent on a multiplicative index and an underlying index according to various embodiments. The multiplicative and underlying indices may be any multiplicative and underlying index pair including, for example, the BMA rate and LIBOR. A payoff function for the derivative may be expressed at step 302. The payoff function may be a function of the multiplicative index and the underlying index, for example, as shown in Equation 3 below:

$$P(B_{T,T}, F_{T,T}) \qquad (3)$$

It will be appreciated that the form of the payoff function may vary depending on factors including, for example, the type of derivative being modeled.

At step 304, a value of the derivative, V(t), may be expressed. The value V(t) may be the expected value of the derivative's payoff function, as shown in Equation 4 below:

$$V(t) = N_t E_t^Q \left[ \frac{P(B_{T,T}, F_{T,T})}{N_T} \right], \qquad (4)$$

where N is a selected numeraire and Q is the equivalent martingale measure to N. As shown in Equation 4, V(t) is a function of the multiplicative index, $B_{t,T}$, and the underlying index $F_{t,T}$. At step 306, V(t) may also be expressed in terms of the underlying index $F_{t,T}$ and the ratio $R_{t,T}$ by substituting the underlying index $F_{t,T}$ multiplied by the ratio $R_{t,T}$ for the multiplicative index $B_{t,T}$ as shown in Equation 5:

$$V(t) = N_t E_t^Q \left[ \frac{P(R_{T,T}, F_{T,T}, F_{T,T})}{N_T} \right] \qquad (5)$$

Substituting Equation 2 above into Equation 5 yields Equation 6:

$$V(t) = N_t E_t^Q \left[ P\left( F_{T,T}\left( c_T - \frac{b_T^2}{4a_T} \right) + \left( a_T F_{T,T}^3 + b_T F_{T,T}^2 + \frac{b_T^2}{4a_T} F_{T,T} \right), F_{T,T} \right) / N_T \right] \qquad (6)$$

Coefficients $a_T$, $b_T$, $c_T$ of the Equation 6 may be calculated, for example, as described above with respect to Equation 2. When the coefficients are found, the value of the derivative for any value of the underlying index may be found by solving Equation 6 at step 308. For example, a value of the underlying index may be provided. The value may represent an estimate of the underlying index at some point over the term of the derivative. Equation 6 may be solved for the provided value of the underlying index, leading to an estimate of the value of the derivative.

Figure 4:
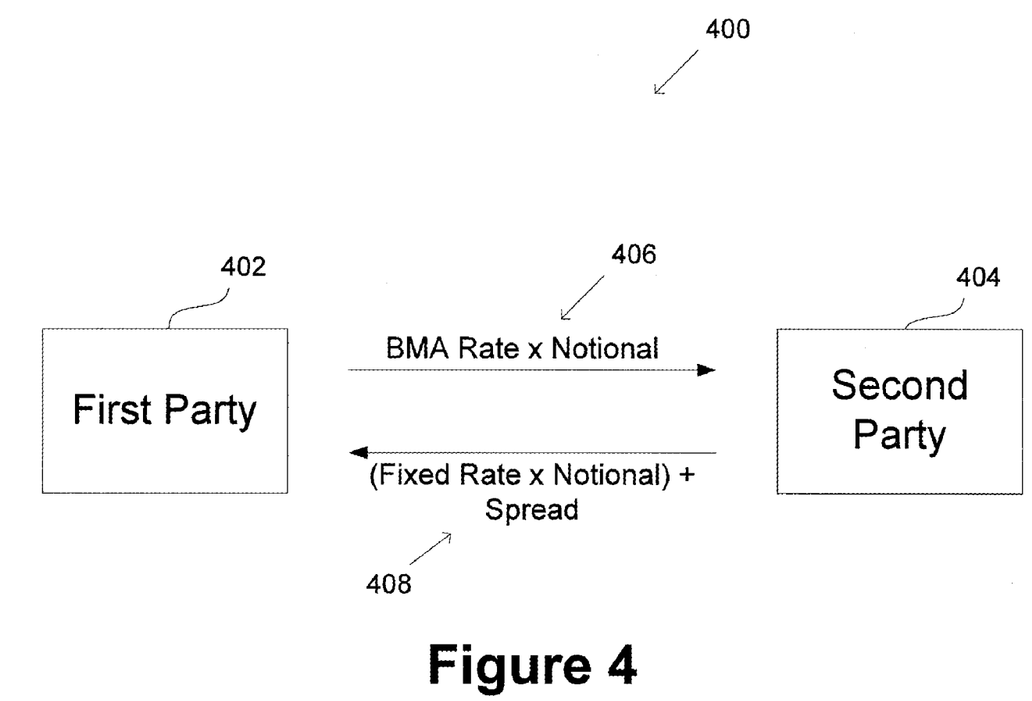
FIG. 4 is a diagram of an exemplary derivative according to various embodiments.

Derivative values calculated according to the process flows 100 and 300 may be used by various parties to the derivatives as well as others interested in the derivatives, including analysts, regulators, financial engineers, etc. FIG. 4 shows a non-limiting example derivative 400 between a first party 402 and second party 404 based on a multiplicative/underlying index pair, here the BMA rate and LIBOR. Under a first leg 406 of the derivative, the first party 402 pays the second party 404 the BMA rate times a notional amount. Under a second leg 408, the second party 404 pays first party 402 a fixed rate times the notional amount. It will be appreciated that any derivative based on a multiplicative index or ratio may be valued according to various embodiments, and that the derivative 400 is but one illustrative example.

A financial engineer, or other derivative designer, may use the derivative values found according to process flows 100 and/or 300 to design a derivative. For example, using the derivative 400 as an example, the financial engineer may use the process flows 100 and/or 300 above to find the net payout of the derivative 400 for values of LIBOR expected during the term of the derivative 400. Based on the results, the financial engineer may choose and/or modify a value for the fixed rate of leg 408 to bring about desired net payout characteristics. For example, the financial engineer may set the fixed rate so that net payout of the derivative for expected values of LIBOR is zero. The financial engineer may also set the fixed rate so that the net payout of the derivative favors first party 402 or second party 404.

Other parties interested in a derivative, such as, for example, derivative 400, may also use derivative values found according to process flows 100 and/or 300 to determine the risk associated with the derivative and find an adequate hedge. For example, referring to the derivative 400, the first party 404 has a short position on the BMA rate. The obvious hedge would be for the first party 404 to enter a derivative giving it a long position on the BMA rate. Such a hedge may not be available, though. Accordingly, the first party 404 may use the derivative values found according to process flow 100 and/or 300 above to find its risk associated with derivative 400 in terms of the underlying index, here, LIBOR. For example, knowing the payout of the derivative 400 for various values of LIBOR may allow the first party 404 to hedge the derivative 400 with a second, more readily available derivative based on the underlying index, here, LIBOR.

FIG. 5 shows a diagram of a system 500 for finding the value of derivatives based on a multiplicative index as a function of an underlying index according to various embodiments. The multiplicative and underlying indices may be any multiplicative and underlying index pair including, for example, the BMA rate and LIBOR. The system 500 includes a computer 502, which may be in communication with a database 510. The computer 502 may receive input from and provide results to one or more client computers 504 via a network 508. The network 508 may be any kind of wired or wireless network.

The computer 502 itself may include modules 512, 514, 516 for performing tasks related to modeling the multiplicative index. The various modules 512, 514, 516 of the computer system 502 may be implemented as software code to be executed by a processor(s) of the computer 502 or any other computer system using any type of suitable computer instruction type. The software code may be stored as a series of instructions or commands on a computer readable medium. In various embodiments, the computer 502, through modules 512, 514, 516, may perform some or all of the respective steps of the process flows 100 and 300 described above.

The calculation module 512 may perform various processing steps necessary to generate models of multiplicative indices and derivatives based thereon. In various embodiments, the calculation module 512 may prompt the client computer 504 to select the type of model to be developed. For example, the calculation module 512 may generate a model of the ratio and/or the multiplicative index, as described by process flow 100 above, a direct model of the value of a derivative, as described by process flow 300 above, or any other economic parameter based on the multiplicative index. In instances where the calculation module 512 is to directly model the value of a derivative, it may additionally prompt the client computer 504 for the type of derivative to be modeled. An equation representing the payoff and/or value of the derivative may then be acquired, for example, from database 510. In various non-limiting embodiments, the computer 502 may prompt the client computer 504 for an equation representing the payoff and/or value function of the derivative.

The calculation module 512 may also prompt the client computer 504 to select the function or functions that the model will utilize. For example, the calculation module 512 may derive a model that is quadratic in a first range and constant in a second rage, as described above. In various embodiments, however, the calculation module 512 may derive other models based on any combination of functions, (e.g., other polynomials, exponentials, etc.). The calculation module 512 may also derive parameters or coefficients for equations included in the models it develops by comparing the models to historical values of the multiplicative and underlying indices. The historical values may, in various embodiments, be stored at database 510.

The system 500 may also include an application module 514. The application module 514 may apply the models developed by the calculation module 512 to generate concrete estimates of economic parameters including, for example, multiplicative indices, values of derivatives based on the multiplicative indices, etc. In various embodiments, the application module 514 may receive inputs including, for example, a value (e.g., a current value, expected value, etc.) of the underlying index. These inputs may be received from the client computer 504, or in various embodiments, may be received from database 510. The application module 512 may apply models by solving one or more equations given the value of the underlying index.

The system 500 may also include a user interface module 516. The user interface module may provide a user interface to the client computer 504. A user of the client computer may access the user interface, for example, using browser software 506. The user interface may provide output to the client computer 504 including, for example, the general form of models generated by the calculation module 512 and the results of estimates based on the multiplicative index generated by the application module 514. The user interface generated by the user interface module 516 may also solicit input from the client computer 504 including, for example, type of model to be generated, the type of derivative to be modeled, the type of function to use in the model, etc. It will be appreciated that in various non-limiting embodiments, the computer 502 itself may include input and output devices (e.g., a monitor, keyboard, mouse, etc.) for providing a user interface.

It is to be understood that the figures and descriptions of the present invention have been simplified to illustrate elements that are relevant for a clear understanding of the present invention, while eliminating, for purposes of clarity, other elements, such as, for example, details of the software for implementing the various modules 512, 514, 516. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for stand-alone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A computer system for calculating a value of a derivative, the system comprising:
   at least one electronic processor and operatively associated memory, wherein the memory comprises instructions that when executed by the processor cause the processor to:
   receive data indicating historical values of a first index, wherein the first index indicates an interest rate for tax-exempt municipal bonds;
   receive data indicating historical values of a second index, wherein the second index indicates an interest rate for non-tax-exempt instruments;
   receive data indicating a value of the second index;
   estimate a ratio of the first index over the second index over at least a range of potential values of the second index as an index function, wherein:

$$\text{the index function} = (a_T F_T^2 + b_T F_T + c_T)\Theta(F_T) + \left(c_T - \frac{b_T^2}{4a_T}\right)(1 - \Theta(F_T))$$

$$\text{the index function} = 1, \quad \text{if } F_T \leq -\frac{b_T}{2a_T};$$

-continued $$\text{the index function} = 0, \text{ if } F_T > -\frac{b_T}{2a_T};$$

wherein $F_T$ is the second index, $a_T$, $b_T$ and $c_T$ are parameters of the index function, and wherein estimating the ratio comprises calculating $a_T$, $b_T$ and $c_T$ by comparing the index function to the data indicating historical values of the first index and the data indicating historical values of the second index;
    calculate a value for the index function based on the calculated values for $a_T$, $b_T$ and $c_T$ and the value of the second index; and
    calculate the value of the derivative considering the calculated value of the index function and the value of the second index, wherein the value of the derivative is a function of the first index.

2. The system of claim 1, wherein the memory further comprises instructions that when executed by the at least one processor cause the at least one processor to modify a characteristic of the derivative based on the value of the derivative for the first value of the index function.

3. The system of claim 1, wherein the memory further comprises instructions that when executed by the at least one processor cause the at least one processor to hedge the derivative with a second derivative based on the second index.

4. The system of claim 1, wherein the memory further comprises instructions that when executed by the at least one processor cause the at least one processor to estimate the index function as a constant over a second range of values of the second index.

5. The system of claim 1, wherein calculating $a_T$, $b_T$ and $c_T$ comprises calculating $a_T$, $b_T$ and $c_T$ according to a linear regression method.

6. The system of claim 1, wherein the first index is the BMA Municipal Swap Index and the second index is the 7 day LIBOR rate.

7. The system of claim 1, wherein the first index is a four week rolling average of the BMA Municipal Swap Index and the second index is the 30 day LIBOR rate.

8. A computer system for calculating a value of a derivative, the system comprising:
    at least one electronic processor and operatively associated memory, wherein the memory comprises instructions that when executed by the processor cause the processor to:
        receive data indicating historical values of a first index, wherein the first index indicates an interest rate for tax-exempt municipal bonds;
        receive data indicating historical values of a second index, wherein the second index indicates an interest rate for non-tax-exempt instruments;
        receive data indicating a value of the second index;
        estimate a ratio of the first index over the second index over at least a range of potential values of the second index as an index function, wherein:

$$\text{the index function} = (a_T F_T^2 = b_T F_T + c_T)\Theta(F_T) + \left(c_T - \frac{b_T^2}{4a_T}\right)(1 - \Theta(F_T))$$

$$\text{the index function} = 1, \text{ if } F_T \leq -\frac{b_T}{2a_T};$$

$$\text{the index function} = 0, \text{ if } F_T > -\frac{b_T}{2a_T};$$

wherein $F_T$ is the second index, $a_T$, $b_T$ and $c_T$ are parameters of the index function, and wherein estimating the ratio comprises calculating $a_T$, $b_T$ and $c_T$ by comparing the index function to the data indicating historical values of the first index and the data indicating historical values of the second index;
    receive a first value function of the derivative, wherein the value function is in terms of the first index;
    derive a second value function of the derivative in terms of the second index by substituting the index function into the first value function; and
    calculate the value of the derivative by computing the second value function for the first value of the second index.

9. The system of claim 8, wherein the memory further comprises instructions that when executed by the at least one processor cause the at least one processor to modify a characteristic of the derivative based on the value of the derivative.

10. The system of claim 8, wherein the memory further comprises instructions that when executed by the at least one processor cause the at least one processor to hedge the derivative with a second derivative based on the second index.

11. The system of claim 8, wherein calculating $a_T$, $b_T$ and $c_T$ comprises calculating $a_T$, $b_T$ and $c_T$ according to a linear regression method.

12. The system of claim 8, wherein the first index is the BMA Municipal Swap Index and the second index is the 7 day LIBOR rate.

13. The system of claim 8, wherein the memory further comprises instructions that when executed by the at least one processor cause the at least one processor to estimate the index function as a constant over a range of the second index.

14. A computer readable storage medium including instructions that, when executed by at least one processor, cause the at least one processor to:
    receive data indicating historical values of a first index, wherein the first index indicates an interest rate for tax-exempt municipal bonds;
    receive data indicating historical values of a second index, wherein the second index indicates an interest rate for non-tax-exempt instruments;
    receive data indicating a value of the second index;
    estimate a ratio of the first index over the second index over at least a range of potential values of the second index as an index function, wherein:

$$\text{the index function} = (a_T F_T^2 = b_T F_T + c_T)\Theta(F_T) + \left(c_T - \frac{b_T^2}{4a_T}\right)(1 - \Theta(F_T))$$

$$\text{the index function} = 1, \text{ if } F_T \leq -\frac{b_T}{2a_T};$$

$$\text{the index function} = 0, \text{ if } F_T > -\frac{b_T}{2a_T};$$

wherein $F_T$ is the second index, $a_T$, $b_T$ and $c_T$ are parameters of the index function, and wherein estimating the ratio comprises calculating $a_T$, $b_T$ and $c_T$ by comparing the index function to the data indicating historical values of the first index and the data indicating historical values of the second index;
    calculate a value for the index function based on the calculated parameter calculated values for $a_T$, $b_T$ and $c_T$ and the value of the second index; and
    calculate the value of the derivative considering the calculated value of the index function and the value of the second index, wherein the value of the derivative is a function of the first index, and wherein the computer readable storage medium is a tangible computer readable medium.

15. A computer readable storage medium including instructions that when executed cause a processor to:
- receive data indicating historical values of a first index, wherein the first index indicates an interest rate for tax-exempt municipal bonds;
- receive data indicating historical values of a second index, wherein the second index indicates an interest rate for non-tax-exempt instruments;
- receive data indicating a value of the second index;
- estimate a ratio of the first index over the second index over at least a range of potential values of the second index as an index function, wherein:

$$\text{the index function} = (a_T F_T^2 = b_T F_T + c_T)\Theta(F_T) + \left(c_T - \frac{b_T^2}{4a_T}\right)(1 - \Theta(F_T))$$

$$\text{the index function} = 1, \text{ if } F_T \leq -\frac{b_T}{2a_T};$$

$$\text{the index function} = 0, \text{ if } F_T > -\frac{b_T}{2a_T};$$

wherein $F_T$ is the second index, $a_T$, $b_T$ and $c_T$ are parameters of the index function, and wherein estimating the ratio comprises calculating $a_T$, $b_T$ and $c_T$ by comparing the index function to the data indicating historical values of the first index and the data indicating historical values of the second index;
- receive a first value function of the derivative, wherein the value function is in terms of the first index;
- derive a second value function of the derivative in terms of the second index by substituting the index function into the first value function; and
- calculate the value of the derivative by computing the second value function for the first value of the second index, and wherein the computer readable storage medium is a tangible computer readable medium.

* * * * *

UNITED STATES PATENT AND TRADEMARK OFFICE
CERTIFICATE OF CORRECTION

PATENT NO.       : 7,925,560 B2  
APPLICATION NO.  : 11/296611  
DATED            : April 12, 2011  
INVENTOR(S)      : Vasily Strela and Matthew Grayson Page 1 of 1

It is certified that error appears in the above-identified patent and that said Letters Patent is hereby corrected as shown below:

In the Claims:

Column 9, Line 60, in Claim 8, delete

"the index function = $(a_T F^2{}_T = b_T F_T + c_T)\Theta(F_T) + (c_T - \frac{b_T{}^2}{4a_T})(1 - \Theta(F_T))$" and substitute --the index function = $(a_T F^2{}_T + b_T F_T + c_T)\Theta(F_T) + (c_T - \frac{b_T{}^2}{4a_T})(1 - \Theta(F_T))$ --

Column 10, Line 47, in Claim 14, delete

"the index function = $(a_T F^2{}_T = b_T F_T + c_T)\Theta(F_T) + (c_T - \frac{b_T{}^2}{4a_T})(1 - \Theta(F_T))$" and substitute --the index function = $(a_T F^2{}_T + b_T F_T + c_T)\Theta(F_T) + (c_T - \frac{b_T{}^2}{4a_T})(1 - \Theta(F_T))$ --

Column 10, Lines 59-60, in Claim 14, delete "at least one calculated parameter calculated" and substitute --calculated values for $a_T$, $b_T$, and $c_T$ --

Column 11, Line 16, in Claim 15, delete

"the index function = $(a_T F^2{}_T = b_T F_T + c_T)\Theta(F_T) + (c_T - \frac{b_T{}^2}{4a_T})(1 - \Theta(F_T))$" and substitute --the index function = $(a_T F^2{}_T + b_T F_T + c_T)\Theta(F_T) + (c_T - \frac{b_T{}^2}{4a_T})(1 - \Theta(F_T))$ --

Signed and Sealed this  
Twenty-third Day of October, 2012

David J. Kappos  
*Director of the United States Patent and Trademark Office*